(12) United States Patent
Gillin et al.

(10) Patent No.: US 7,899,464 B2
(45) Date of Patent: Mar. 1, 2011

(54) PROVIDING WIRELESS INFORMATION TRANSPORTATION USING DUAL FREQUENCIES

(75) Inventors: Michael Gillin, Atlanta, GA (US); Kenneth Williams, Kennesaw, GA (US); Pablo Kelly Piquerez, Kennesaw, GA (US)

(73) Assignee: Cox Communications, Inc., Atlanta, GA (US)

( * ) Notice: Subject to any disclaimer, the term of this patent is extended or adjusted under 35 U.S.C. 154(b) by 657 days.

(21) Appl. No.: 11/507,215

(22) Filed: Aug. 21, 2006

(65) Prior Publication Data

US 2006/0281468 A1    Dec. 14, 2006

Related U.S. Application Data

(63) Continuation-in-part of application No. 11/237,108, filed on Sep. 28, 2005.

(60) Provisional application No. 60/672,783, filed on Apr. 19, 2005.

(51) Int. Cl.
*H04W 72/00* (2009.01)

(52) U.S. Cl. ............... 455/454; 455/452.2; 455/552.1; 455/553.1

(58) Field of Classification Search ............ 455/454, 455/452.2, 553.1, 552.1
See application file for complete search history.

(56) References Cited

U.S. PATENT DOCUMENTS

| | | | |
|---|---|---|---|
| 5,937,348 A | 8/1999 | Cina et al. | 455/421 |
| 6,014,546 A | 1/2000 | Georges et al. | 725/79 |
| 6,366,584 B1 * | 4/2002 | Gulliford et al. | 370/403 |
| 6,411,825 B1 | 6/2002 | Csapo et al. | 455/561 |
| 6,895,218 B2 | 5/2005 | Yarkosky | 455/20 |
| 7,013,145 B1 | 3/2006 | Centore, III | 455/454 |
| 7,123,649 B1 | 10/2006 | Smith et al. | 375/222 |
| 7,394,439 B1 * | 7/2008 | Johnson et al. | 343/890 |
| 7,400,903 B2 * | 7/2008 | Shoemake et al. | 455/552.1 |
| 7,715,816 B2 | 5/2010 | Williams et al. | |
| 7,715,817 B2 | 5/2010 | Williams et al. | |
| 2001/0010689 A1 | 8/2001 | Awater et al. | 370/344 |
| 2001/0051503 A1 | 12/2001 | Lush | 455/2.01 |
| 2002/0107809 A1 | 8/2002 | Biddle et al. | 705/59 |

(Continued)

OTHER PUBLICATIONS

U.S. Office Action dated Sep. 17, 2008 cited in U.S. Appl. No. 11/237,108.

(Continued)

*Primary Examiner* — Barry W Taylor
(74) *Attorney, Agent, or Firm* — Merchant & Gould

(57) ABSTRACT

Wireless information transportation may be provided. An unlicensed radio frequency may be used to transmit information from a first point to a second point. Then, the unlicensed radio frequency may be determined to no longer provide a sufficient service level. Next, a license to operate in a licensed radio frequency may be purchased when it is determined that the unlicensed radio frequency no longer provides the sufficient service. The license may limit the use of the licensed radio frequency to a point-to-point configuration. Using the unlicensed radio frequency to transmit information from the first point to the second point may be discontinued when it is determined that the unlicensed radio frequency no longer provides the sufficient service level. Then the licensed radio frequency may be used to transmit information from the first point to the second point in the point-to-point configuration when use of the unlicensed radio frequency is discontinued.

20 Claims, 4 Drawing Sheets

U.S. PATENT DOCUMENTS

| | | | |
|---|---|---|---|
| 2003/0054763 A1* | 3/2003 | Judd et al. | 455/20 |
| 2004/0212503 A1 | 10/2004 | Stilp | 340/572.1 |
| 2004/0259555 A1 | 12/2004 | Rappaport et al. | 455/446 |
| 2006/0025149 A1* | 2/2006 | Karaoguz et al. | 455/452.2 |
| 2006/0148482 A1 | 7/2006 | Mangold | 455/450 |
| 2006/0221889 A1 | 10/2006 | Murdock et al. | 370/328 |
| 2006/0234766 A1 | 10/2006 | Gillin et al. | |
| 2007/0069901 A1 | 3/2007 | Tuck et al. | 340/573.1 |
| 2007/0155325 A1 | 7/2007 | Bambic et al. | 455/41.2 |
| 2007/0249317 A1 | 10/2007 | Williams et al. | |
| 2007/0249318 A1 | 10/2007 | Williams et al. | |
| 2009/0103509 A1* | 4/2009 | Sanderford et al. | 370/343 |

OTHER PUBLICATIONS

U.S. Final Office Action dated Mar. 19, 2009 cited in U.S. Appl. No. 11/237,108.

U.S. Office Action dated Jul. 24, 2009 cited in U.S. Appl. No. 11/407,641.

U.S. Office Action dated Jul. 24, 2009 cited in U.S. Appl. No. 11/407,648.

U.S. Office Action dated Sep. 29, 2009 cited in U.S. Appl. No. 11/237,108.

U.S. Final Office Action dated Apr. 1, 2010 cited in U.S. Appl. No. 11/237,108.

* cited by examiner

PROVIDING WIRELESS INFORMATION TRANSPORTATION USING DUAL FREQUENCIES

RELATED APPLICATION

This patent application is a continuation-in-part of U.S. patent application Ser. No. 11/237,108, entitled "METHODS AND SYSTEMS FOR PROVIDING WIRELESS INFORMATION TRANSPORTATION USING DUAL FREQUENCIES," filed on Sep. 28, 2005, assigned to the same assignee as the current application, and is incorporated herein by reference. Furthermore, in U.S. patent application Ser. No. 11/237,108, under provisions of 35 U.S.C. §119(e), Applicants claimed the benefit of U.S. provisional application no. 60/672,783 entitled "METHODS AND SYSTEMS FOR PROVIDING A POINT-TO-POINT WIRELESS HOP USING DUAL FREQUENCIES," filed Apr. 19, 2005, which is also incorporated herein by reference.

BACKGROUND OF THE INVENTION

Service providers, such as broadband service providers, generally provide service to customer premises using, for example, a wire or fiber. In many situations, however, the service providers' access to customer premises using wires or fibers may be limited. For example, access to the customer may be constrained or even forbidden by the customer's building owner. In addition, many times the prospective revenue associated with a service may not warrant the services construction cost. For example, the prospective revenue may not justify the cost for trenching underneath a parking lot and serving a customer premises. Furthermore, access to customer premises using wires or fibers may be limited due to historic ordinances or right-of-way constraints. For example, construction at the customer premises may be prohibited by law or the location may be so congested that construction to the customer premises may not be possible.

Moreover, in some situations, while the service provider's access to the customer premises using wires or fibers may not be limited, it may be delayed by issues beyond the service provider's control. For example, in some locations, it may take a time period (e.g. 6 months to a year) to be permitted by a local government to construct service to a customer premises using, for example, a wire or fiber. The service provider, however, may have already signed a contract that is ready to generate revenue. In this situation, the construction delay may result in lost revenue for the service provider.

Thus, the conventional strategy is to provide service using, for example, a wire or a fiber. This often causes problems because the conventional strategy at least does not address the aforementioned access limitations. In view of the foregoing, there is a need for methods and systems for providing wireless information transportation more optimally.

SUMMARY OF THE INVENTION

Consistent with embodiments of the present invention, systems and methods may be disclosed for wireless information transportation. First, an unlicensed radio frequency may be used to transmit information from a first point to a second point. Then, the unlicensed radio frequency may be determined to no longer provide a sufficient service level between the first point and the second point. Next, a license to operate in a licensed radio frequency may be purchased when it is determined that the unlicensed radio frequency no longer provides the sufficient service. The license may limit the use of the licensed radio frequency to a point-to-point configuration. The point-to-point configuration may be defined in the license based upon a location of the first point and a location of the second point. The license may limit the use of the licensed radio frequency for communications between the location of the first point and the location of the second point. Using the unlicensed radio frequency to transmit information from the first point to the second point may be discontinued when it is determined that the unlicensed radio frequency no longer provides the sufficient service level between the first point and the second point. Then the licensed radio frequency may be used to transmit information from the first point to the second point in the point-to-point configuration when use of the unlicensed radio frequency is discontinued.

Both the foregoing general description and the following detailed description are examples and should not be considered to restrict the invention's scope, as described and claimed. Further, features and/or variations may be provided in addition to those set forth herein. For example, embodiments of the invention may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
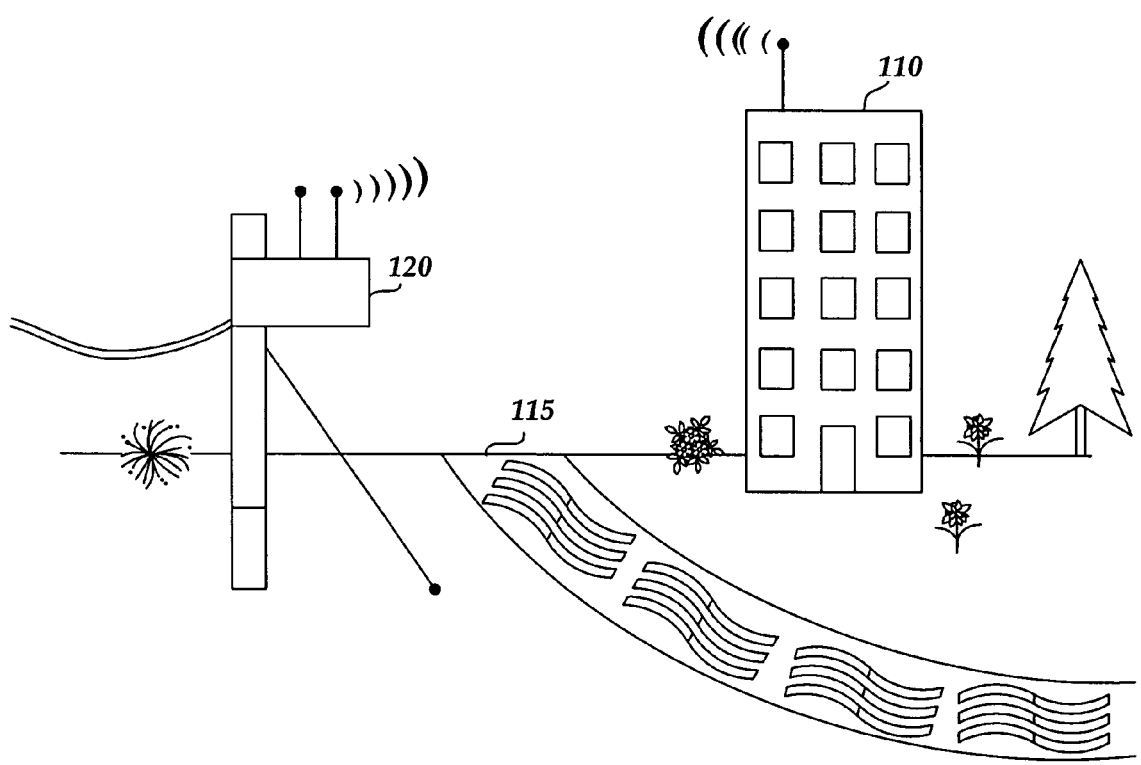
FIG. 1 is a block diagram of a wireless transport system.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Systems and methods consistent with embodiments of the present invention provide wireless information transportation. Embodiments of the present invention may comprise a wireless transportation system used, for example, in lieu of wire or fiber line construction. By using a wireless transportation system, for example, unfavorable building access agreements, legal constraints, right-of-way constraints, construction costs, and construction time delays may be avoided. The wireless transportation system may be used to communicate, but is not limited to, communicating, voice-over-internet protocol (VOIP), data, and multi-media content.

In providing wireless information transportation, service providers may wish to "guarantee" service, but also may wish to limit the cost for providing the service as much as possible.

Consistent with embodiments of the invention, an unlicensed and a licensed frequency may be used. While there may be no licensing cost for the unlicensed frequency, because the number of unlicensed wireless access points is growing, crowding in the unlicensed frequencies in some locations may present one risk with using unlicensed frequencies. With licensed frequencies, while the user may have exclusive use (unlike unlicensed frequencies), one issue may be that the Federal Communications Commission (FCC) charges a licensing fee, for example, for a 10 year point-to-point license. Accordingly, a cost may be associated with using the licensed frequency that may not be found with the unlicensed frequency.

An embodiment consistent with the invention may comprise a system for providing wireless information transportation. The system may comprise an unlicensed radio configured to use an unlicensed radio frequency to transmit information from a first point to a second point in a data transportation system. Furthermore, the system may comprise a licensed radio configured to use a licensed radio frequency to transmit information from the first point to the second point in the data transportation system when use of the unlicensed radio frequency is discontinued when it is determined that the unlicensed radio frequency no longer provides a sufficient service level. The aforementioned system is exemplary and other systems, components, or processors may comprise the aforementioned system consistent with embodiments of the present invention.

By way of a non-limiting example, FIG. 1 illustrates a wireless transport system 100 in which the features and principles of the present invention may be implemented. As illustrated in the block diagram of FIG. 1, system 100 may include a customer premises 110, an obstacle 115, and a dual frequency radio system 120. A service provider, such as a broadband service provider for example, may wish to provide service to customer premises 110 using, for example, a wire or fiber (not shown). The service provider's access to customer premises 110 using wires or fibers, however, may be limited. For example, obstacle 115 may limit the service provider's access to customer premises 110. While FIG. 1 shows a river as obstacle 115, the river is an example and obstacle 115 may comprise anything that may limit the service provider's access to customer premises 110. While dual frequency radio system 120 is shown in FIG. 1 as mounted to a pole, dual frequency radio system 120 is not limited to being mounted to a pole. For example, dual frequency radio system 120 may be mounted a on a building, on a tower, an aerial strand, or any other launch location from which dual frequency radio system 120 may be "shooting" signal.

In addition, prospective revenue associated with a service may not warrant the cost, for example, for trenching underneath obstacle 115 (e.g. a parking lot, a river, a road, etc.) to server customer premises 110. Furthermore, obstacle 115 may not be a physical element. For example, access to customer premises 110 may be constrained or even forbidden by the customer's building owner. Furthermore, access to customer premises using wires or fibers may be limited due to historic ordinances or right-of-way constraints. For example, construction at customer premises 110 may be prohibited by law or customer premises 110 may be so congested that construction to customer premises 110's location may not be possible.

Figure 2A:
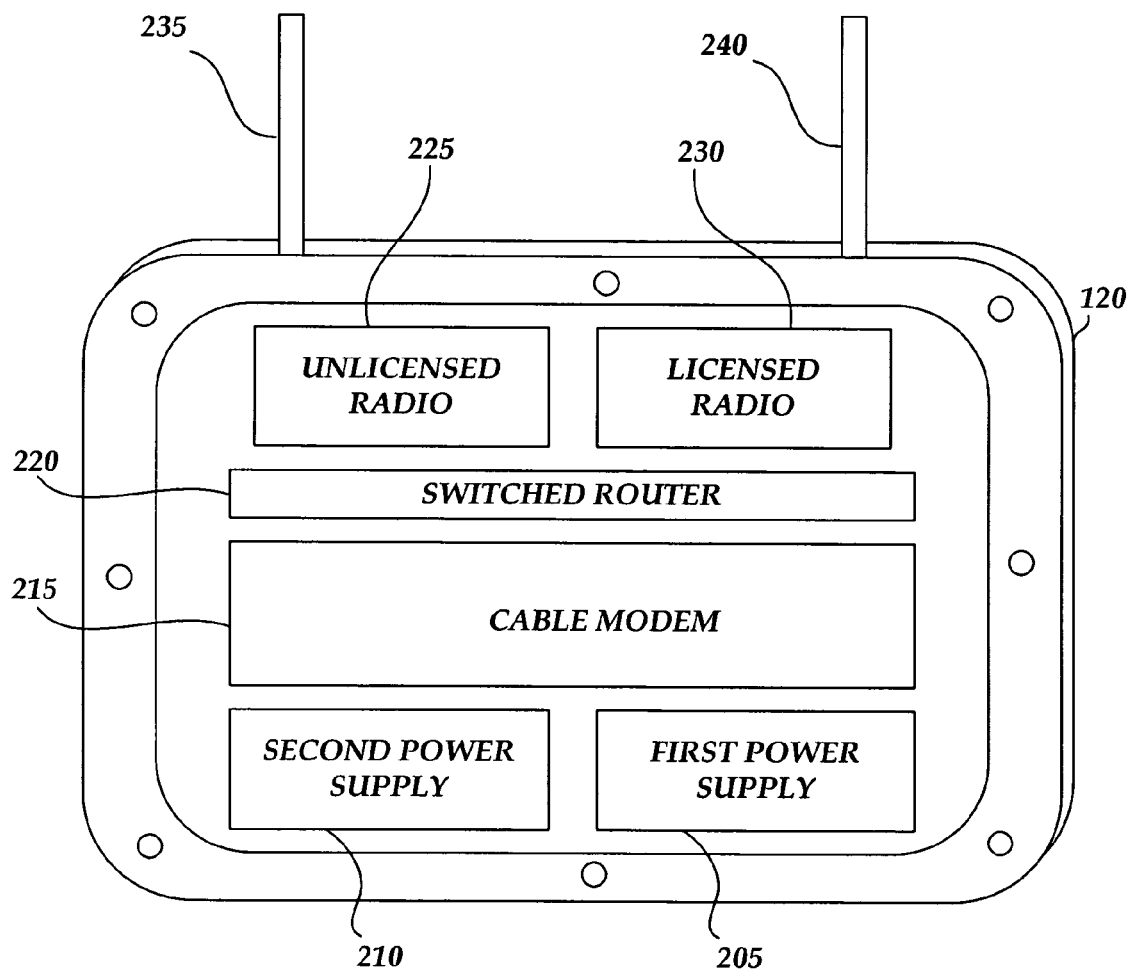
FIG. 2A is a block diagram of a dual frequency radio system.

In order to overcome obstacle 115, service may be provided to customer premises 110 wirelessly using, for example, dual frequency radio system 120. FIG. 2A shows dual frequency radio system 120 of FIG. 1 in more detail. As shown in FIG. 2A, dual frequency radio system 120 may include a first power supply 205, a second power supply 210, a cable modem 215, a switched router 220, an unlicensed radio 225, and a licensed radio 230. Dual frequency radio system 120 may be powered by first power supply 205, which may be backed-up by second power supply 210. Data may enter dual frequency radio system 120 via cable modem 215. Once the data enters dual frequency radio system 120, switched router 220 may direct the data to either of unlicensed radio 225 and licensed radio 230. Unlicensed radio 225 may operate on an unlicensed frequency band. Likewise, licensed radio 230 may operate on a licensed frequency band. The unlicensed frequency band may comprise, but not limited to, a 900 MHz band, a 2.4 GHz band, and a 5.8 GHz band. The licensed frequency band may comprise, but not limited to, a 700 MHz band, 1.9 GHz band, 2.3 GHz band, 2.5 GHz band, 6 GHz band, 18 GHz band, 23 GHz band, 38 GHz band, 78 GHz band, and 80 GHz band. The aforementioned are examples and the unlicensed frequency band and the licensed frequency band may comprise other frequencies.

Moreover, system 120 may utilize a first antenna 235 or both first antenna 235 and a second antenna 240. For example, unlicensed radio 225 may use first antenna 235 to communicate signals. Similarly, licensed radio 230 may use second antenna 240 to communicate signals. In other embodiments, both unlicensed radio 225 and licensed radio 230 may use the same antenna. For example, using one antenna may be expedited when the unlicensed and licensed frequency bands used by system 100 are similar (e.g. close is value). For example, the unlicensed frequency band may comprise the 5.8 GHz frequency band and the licensed frequency band may comprise 6 GHz frequency band. The aforementioned are examples and other frequency bands may be used.

System 100 may initially operate using unlicensed radio 225. If the unlicensed frequency becomes congested or crowded at some date after the initial installation, a license may be purchased from, for example, the FCC and dual frequency radio system 120 may be switched to operate using licensed radio 230. The aforementioned license purchased from the FCC may, for example, comprise a point-to-point license. Accordingly, the license cost may be avoided for a time period or may never need to be realized. Furthermore, the service provider may "guarantee" the service because unlicensed radio 225, if its frequency band becomes crowded, can be backed-up with licensed radio 230. In this way, the service provider may "guarantee" the service and the cost of a frequency license may be delayed for a time or avoided altogether. System 100 may use a higher power when transmitting in the licensed frequency band than in the unlicensed frequency band.

System 120 may be configured to communicate in a point-to-point configuration to one or more points using a licensed frequency band. While system 100 may communicate in an omni-directional configuration using the unlicensed frequency band, system 120 may communicate in a more directional manner using a licensed frequency band. For example, when transmitting, the energy of signals sent by system 120 in the licensed frequency band may be directed or concentrated on a predetermined point. Antenna may be designed such that energy from antenna 240 (e.g. an antenna 270 or an antenna 275 as descried in more detail below), for example, may be directed to or concentrated on an antenna at customer premises 110. Furthermore, energy from antenna 240, for example, may be directed to or concentrated on multiple antenna and not just one antenna.

Figure 2B:
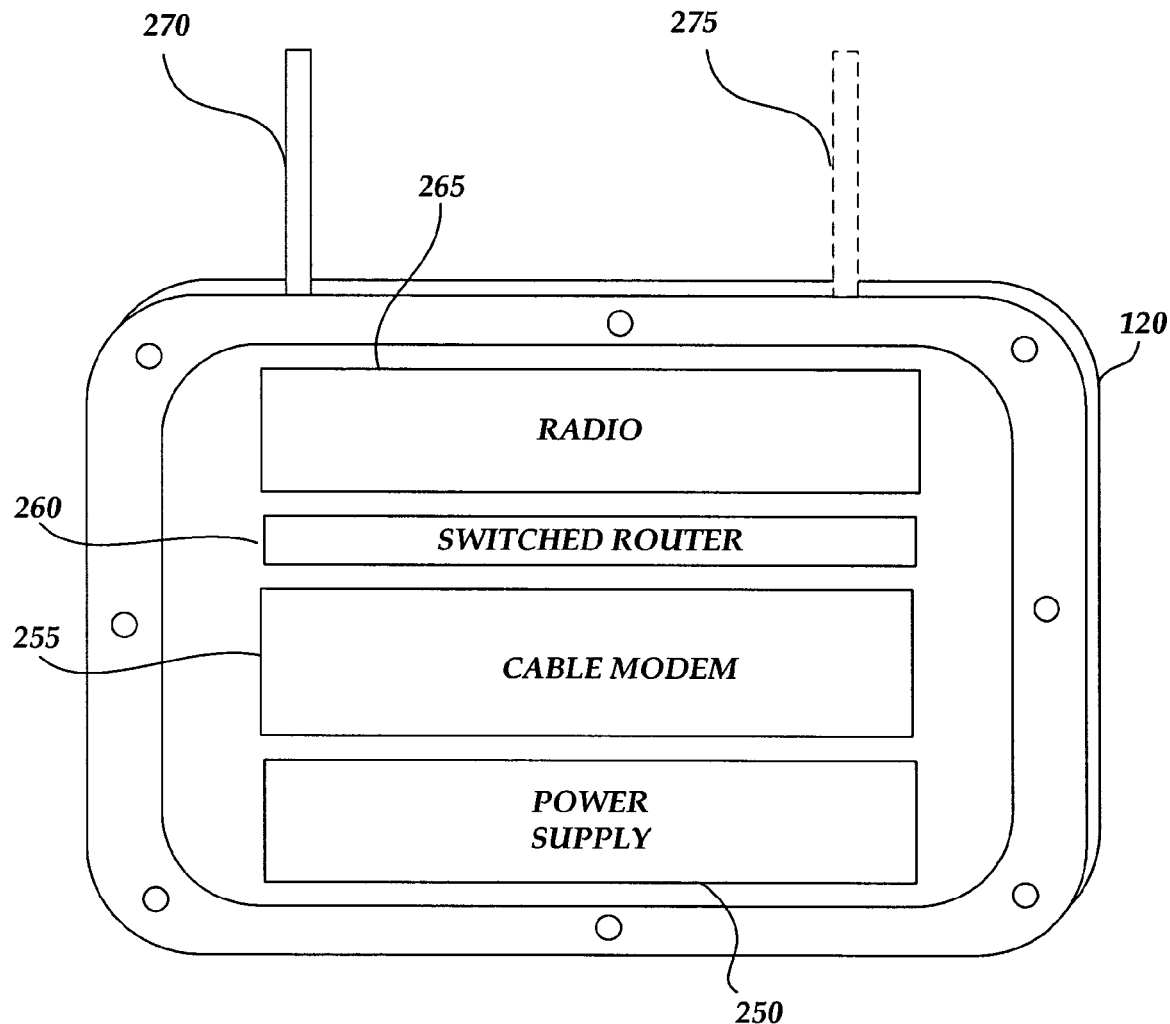
FIG. 2B is a block diagram of a dual frequency radio system.

In another embodiment, in order to overcome obstacle 115, service may be provided to customer premises 110 wirelessly using, for example, dual frequency radio system 120. FIG. 2B shows dual frequency radio system 120 of FIG. 1 in more detail according to other embodiments. As shown in FIG. 2B, dual frequency radio system 120 may include a power supply 250, a cable modem 255, a switched router 260, and a radio 265. Dual frequency radio system 120 may be powered by power supply 250 that may be backed-up by another power supply (not shown). Data may enter dual frequency radio system 120 via cable modem 255. Once the data enters dual frequency radio system 120, switched router 260 may direct the data to radio 265. Radio 265 may operate on an unlicensed frequency band or may operate on a licensed frequency band. The unlicensed frequency band may comprise, but not limited to, a 900 MHz band, a 2.4 GHz band, and a 5.8 GHz band. The licensed frequency band may comprise, but not limited to, a 700 MHz band, 1.9 GHz band, 2.3 GHz band, 2.5 GHz band, 6 GHz band, 18 GHz band, 23 GHz band, 38 GHz band, 78 GHz band, and 80 GHz band. The aforementioned are examples and the unlicensed frequency band and the licensed frequency band may comprise other frequencies.

System 100 may initially operate using radio 265 in the unlicensed frequency band. If the unlicensed frequency becomes congested or crowded at some date after the initial installation, a license may be purchased from, for example, the FCC and radio 265 may be switched to operate using the licensed frequency band. The aforementioned license purchased from the FCC may, for example, comprise a point-to-point license. Accordingly, the license cost may be avoided for a time period or may never need to be realized. Furthermore, the service provider may "guarantee" the service because radio 265, if its unlicensed frequency band becomes crowded, may be switched to a licensed frequency band. In this way, the service provider may "guarantee" the service and the cost of a frequency license may be delayed for a time or avoided altogether. Radio 265 may use a higher power when transmitting in the licensed frequency band than in the unlicensed frequency band.

Furthermore, system 120 may utilize a first antenna 270 or both first antenna 270 and a second antenna 275. For example, radio 265 may use first antenna 270 to communicate signals using an unlicensed frequency band. Similarly, radio 265 may use second antenna 275 to communicate signals using a licensed frequency band. In other embodiments, radio 265 may use only one antenna (e.g. first antenna 270). For example, using one antenna may be expedited when the unlicensed and the licensed frequency bands used by radio 265 are similar (e.g. close is value). For example, the unlicensed frequency band may comprise the 5.8 GHz frequency band and the licensed frequency band may comprise 6 GHz frequency band. The aforementioned are examples and other frequency bands may be used.

Moreover, radio 265 may be configured to operate in the licensed frequency band in a point-to-point configuration to multiple points using one antenna (e.g. antenna 270). Radio 265 may be located at a first point. Radio 265 and antenna 270 may be configured to communicate with a second point in a point-to-point configuration and may also be configured to also communicate with a third point in a point-to-point configuration.

Wireless can be defined as radio transmission via the airwaves. However, it may be appreciated that various other communication techniques can be used to provide wireless transmission, including infrared line of sight, cellular, microwave, satellite, packet radio, and spread spectrum radio. For example, equipment in customer premises 110 and dual frequency radio system 120 may communicate across a wireless interface such as, for example, a cellular interface (e.g., general packet radio system (GPRS), enhanced data rates for global evolution (EDGE), global system for mobile communications (GSM)), a wireless local area network interface (e.g., WLAN, IEEE 802.11), a bluetooth interface, a world interoperability for microwave access (WiMAX) interface, an IEEE 802.16 interface, another RF communication interface, and/or an optical interface.

Figure 3:
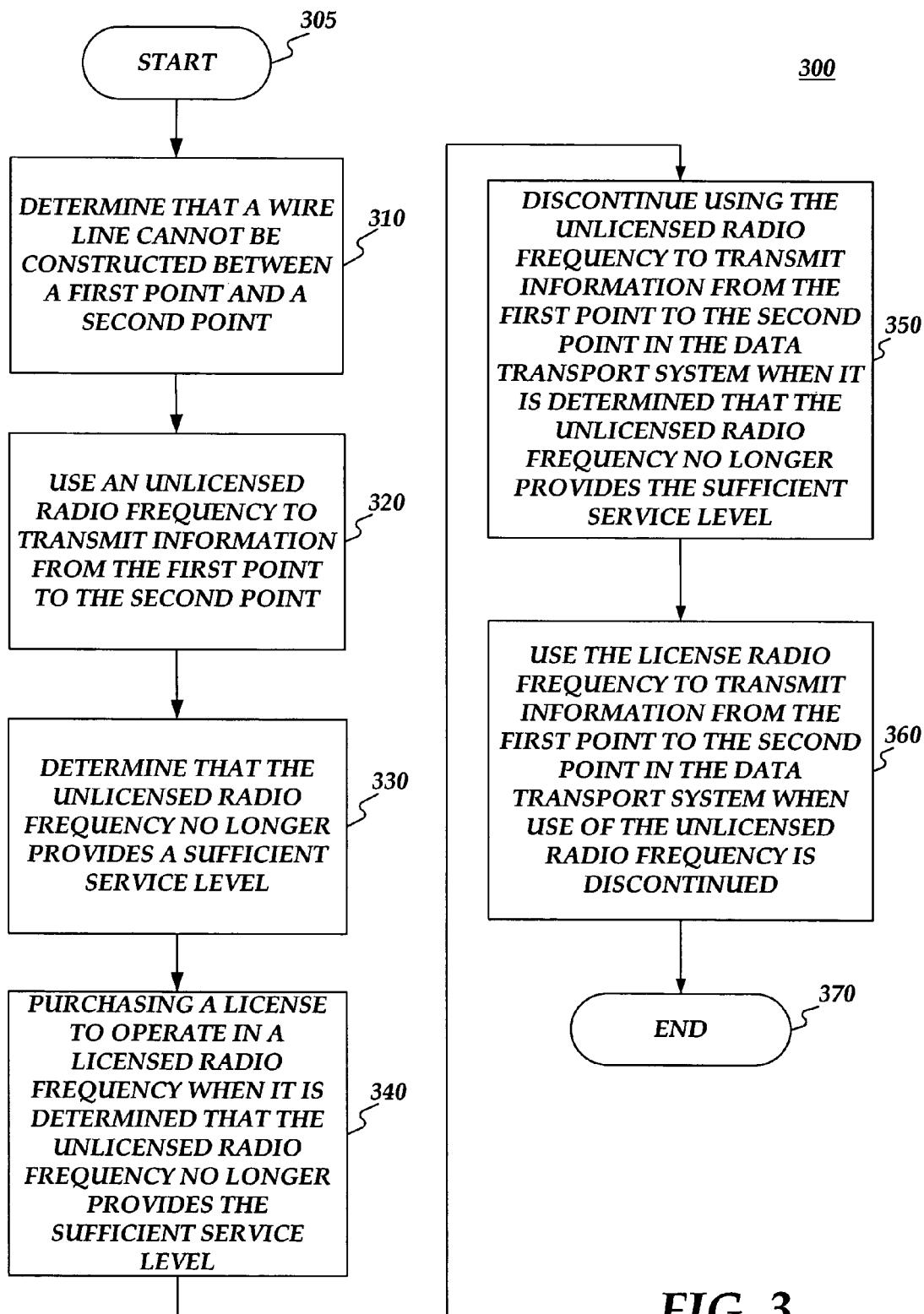
FIG. 3 is a flow chart of a method for providing wireless information transportation.

FIG. 3 is a flow chart setting forth the general stages involved in a method 300 consistent with the invention for providing wireless information transportation using system 100 of FIG. 1. Ways to implement the stages of method 300 will be described in greater detail below. Method 300 may begin at starting block 305 and proceed to stage 310 where a service provider may determine that a wire line cannot be constructed between a first point and a second point. For example, the service provider's access to customer premises 110 using wires or fibers may be limited. Obstacle 115, for example, may limit the service provider's access to customer premises 110. Obstacle 115 may comprise anything that may limit the service providers' access to customer premises 110.

In addition, prospective revenue associated with a service may not warrant the cost, for example, for trenching underneath obstacle 115 (e.g. a parking lot, a river, a road, etc.) and serving customer premises 110. Furthermore, obstacle 115 may not be a physical element. For example, access to customer premises 110 may be constrained or even forbidden by the customer's building owner. Furthermore, access to customer premises using wires or fibers may be limited due to historic ordinances or right-of-way constraints. For example, construction at customer premises 110 may be prohibited by law or customer premises 110 may be so congested that construction to customer premises 110's location may not be possible.

From stage 310, where the service provider may determine that the wire line cannot be constructed, method 300 may advance to stage 320 where the service provider may provision dual frequency radio system 120 to use an unlicensed radio frequency to transmit information from the first point to the second point. For example, the first point may comprise dual frequency radio system 120 and the second point may comprise customer premises 110. Accordingly, unlicensed radio 225 (or radio 265) may transmit information to customer premises 110 on an unlicensed frequency band comprising, but not limited to, one of a 900 MHz band, a 2.4 GHz band, and a 5.8 GHz band. The aforementioned are examples and the unlicensed frequency may comprise other bands.

Once the service provider provisions dual frequency radio system 120 in stage 320, method 300 may continue to stage 330 where the service provider may determine that the unlicensed radio frequency no longer provides a sufficient service level. For example, while there may be no licensing cost with using an unlicensed radio frequency, because the number of wireless access points is growing, crowding in the unlicensed frequencies in some locations may present one risk with using unlicensed frequencies. If the quality of service that the server provider is providing to customer premises 110 degrades to an unacceptable level, the service provider may determine that the unlicensed radio frequency no longer provides a sufficient service level. The threshold between the sufficient service level and the unacceptable level may be defined by a contract between the service provider and the customer or by an industry standard. The quality of service may be based on the band width provided to equipment at customer premises 110 by dual frequency radio system 120, the speed of the connection between equipment at customer premises 110 and dual frequency radio system 120, or the number of lost packets between equipment at customer premises 110 and dual frequency radio system 120. The aforementioned are examples, and the quality of service may be based on other indices.

After the service provider determines that the unlicensed radio frequency no longer provides the sufficient service level in stage 330, method 300 may proceed to stage 340 where the service provider may purchasing a license to operate in a licensed radio frequency. The service provider may purchase the license when it is determined that the unlicensed radio frequency no longer provides the sufficient service level. For example, the license may be purchased from, for example, the FCC and may comprise a point-to-point license. The licensed frequency band may comprise, but not limited to, a 700 MHz band, a 1.9 GHz band, a 2.3 GHz band, a 2.5 GHz band, a 6 GHz band, an 18 GHz band, 23 GHz band, 38 GHz band, 78 GHz band, and 80 GHz band. The aforementioned are examples, and the frequency may be used in ways other than point-to-point and may comprise other bands.

From stage 340, where the service provider purchases the license, method 300 may advance to stage 350 where the service provider may provision dual frequency radio system 120 to discontinue using the unlicensed radio frequency to transmit information from the first point to the second point in the data transportation system. Using the unlicensed radio frequency may be discontinued when it is determined that the unlicensed radio frequency no longer provides the sufficient service level. For example, after the service provider determines that the unlicensed radio frequency no longer provides the sufficient service level and obtains a frequency license, the service provider may provision dual frequency radio system 120 to discontinue using unlicensed radio 225 (or discontinue using the unlicensed frequency band on radio 265).

Once the service provider provisions dual frequency radio system 120 to discontinue using the unlicensed radio frequency in stage 350, method 300 may continue to stage 360 where the service provider may provision dual frequency radio system 120 to use the licensed radio frequency to transmit information from the first point to the second point in the data transportation system. The service provider may provision dual frequency radio system 120 to use the licensed radio frequency when use of the unlicensed radio frequency is discontinued. For example, after the service provider provisions dual frequency radio system 120 to discontinue using unlicensed radio 225 (or discontinue using radio 265 on the unlicensed frequency band), the service provider may provision dual frequency radio system 120 to use licensed radio 230 (or use radio 265 on the licensed frequency band). After the service provider provisions dual frequency radio system 120 to use the licensed radio frequency in stage 360, method 300 may then end at stage 370.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing wireless information transportation, the method comprising:
    using a cable modem to receive information;
    using an unlicensed radio frequency to transmit the information from a first point to a second point, the unlicensed radio frequency comprising a frequency for which a government having sovereignty over an area in which the unlicensed radio frequency is used does not require a license for the unlicensed radio frequency's use;
    determining that the unlicensed radio frequency no longer provides a sufficient service level between the first point and the second point;
    purchasing from the Federal Communications Commission (FCC) of the United States Federal government, in response to determining that the unlicensed radio frequency no longer provides the sufficient service level, a license to operate in a licensed radio frequency when it is determined that the unlicensed radio frequency no longer provides the sufficient service level wherein purchasing the license to operate in the licensed radio frequency comprises purchasing the license that limits the use of the licensed radio frequency to a point-to-point configuration, the point-to-point configuration being defined in the license based upon a location of the first point and a location of the second point, the license limiting the use of the licensed radio frequency for communications between the location of the first point and the location of the second point;
    discontinuing using the unlicensed radio frequency to transmit information from the first point to the second point when it is determined that the unlicensed radio frequency no longer provides the sufficient service level between the first point and the second point;
    using the licensed radio frequency to transmit information from the first point to the second point in the point-to-point configuration when use of the unlicensed radio frequency is discontinued; and
    providing, to a user at the second point, a service guarantee for providing the wireless information transportation in response to purchasing the license from the Federal Communications Commission (FCC) of the United States Federal government.

2. The method of claim 1, wherein purchasing the license to operate in the licensed radio frequency further comprises purchasing the license to operate in the licensed radio frequency wherein the license specifies the location of the first point as global positioning system (GPS) coordinates of the first point and the location of the second point as GPS coordinates of the second point.

3. The method of claim 1, wherein using the unlicensed radio frequency comprises using the unlicensed radio frequency not being assigned to a service provider.

4. The method of claim 1, wherein using the licensed radio frequency comprises using the licensed radio frequency being assigned to a service provider.

5. The method of claim 1, wherein using the unlicensed radio frequency to transmit information from the first point to the second point and using the licensed radio frequency to transmit information from the first point to the second point respectively comprises:
    using a radio to transmit the information from the first point to the second point and using the licensed radio frequency; and
    using the radio to transmit the information from the first point to the second point and using the unlicensed radio frequency.

6. The method of claim 1, wherein using the unlicensed radio frequency to transmit information from the first point to the second point and using the licensed radio frequency to transmit information from the first point to the second point respectively comprises:
    using a first radio to transmit the information from the first point to the second point and using the licensed radio frequency; and
    using a second radio to transmit the information from the first point to the second point and using the unlicensed radio frequency.

7. The method of claim 1, wherein using the unlicensed radio frequency to transmit information from the first point to the second point and using the licensed radio frequency to transmit information from the first point to the second point respectively comprises:
    using an antenna to transmit the information from the first point to the second point and using the licensed radio frequency; and
    using the antenna to transmit the information from the first point to the second point and using the unlicensed radio frequency.

8. The method of claim 1, wherein using the unlicensed radio frequency to transmit information from the first point to the second point and using the licensed radio frequency to transmit information from the first point to the second point respectively comprises:
    using a first antenna to transmit the information from the first point to the second point and using the licensed radio frequency; and
    using a second antenna to transmit the information from the first point to the second point and using the unlicensed radio frequency.

9. The method of claim 1, wherein using the unlicensed radio frequency further comprises using the licensed radio frequency within one of the following frequency bands: 900 MHz; 2.4 GHz; and 5.8 GHz.

10. The method of claim 1, wherein using the licensed radio frequency further comprises using the licensed radio frequency within one of the following frequency bands: 700 MHz; 1.9 GHz; 2.3 GHz; 2.5 GHz; 6 GHz; 18 GHz; 23 GHz; 38 GHz; 70 GHz; and 80 GHz.

11. The method of claim 1, wherein using the unlicensed radio frequency further comprises using at least one of the following standards: Wireless-Fidelity (Wi-Fi), World Interoperability for Microwave Access (WiMAX), Bluetooth; and IEEE 802.

12. The method of claim 1, wherein using the unlicensed radio frequency to transmit information from the first point to the second point and using the licensed radio frequency to transmit information from the first point to the second point comprises using more power to transmit on the licensed frequency that on the unlicensed frequency.

13. A system for providing wireless information transportation, the system comprising:
   a cable modem configured to receive information;
   a transceiver configured to switch between an unlicensed radio frequency and a licensed radio frequency, the unlicensed radio frequency comprising a frequency for which a government having sovereignty over an area in which the unlicensed radio frequency is used does not require a license for the unlicensed radio frequency's use, the licensed radio frequency comprising a frequency for which the government having sovereignty over the area in which the licensed radio frequency is used requires a license for the licensed radio frequency's use, the government having sovereignty comprising the United States Federal government, the license being provided by the Federal Communications Commission (FCC) of the United States Federal government, the transceiver comprising:
      an unlicensed radio configured to communicate the information between a first point and a second point over the unlicensed radio frequency when the transceiver is switched to the unlicensed radio frequency, and
      a licensed radio configured to communicate the information between the first point and the second point over the licensed radio frequency when the transceiver is switched to the licensed radio frequency; and
   a first antenna configured to cause the transceiver to communicate between the first point and the second point over the licensed radio frequency in a point-to-point configuration.

14. The system of claim 13, wherein the first antenna is further configured to cause the transceiver to communicate between the first point and the second point over the unlicensed radio frequency.

15. The system of claim 13, further comprising a second antenna configured to cause the transceiver to communicate between the first point and the second point over the unlicensed radio frequency.

16. The system of claim 13, wherein the unlicensed radio frequency comprises a radio frequency within a 5.8 GHz frequency band and the licensed radio frequency comprises a radio frequency within a 6 GHz frequency band.

17. A system for providing wireless information transportation, the system comprising:
   a cable modem configured to receive information;
   a transceiver configured to switch between an unlicensed radio frequency and a licensed radio frequency, the unlicensed radio frequency comprising a frequency for which a government having sovereignty over an area in which the unlicensed radio frequency is used does not require a license for the unlicensed radio frequency's use, the licensed radio frequency comprising a frequency for which the government having sovereignty over the area in which the licensed radio frequency is used requires a license for the licensed radio frequency's use, the government having sovereignty comprising the United States Federal government, the license being provided by the Federal Communications Commission (FCC) of the United States Federal government, the transceiver comprising:
      an unlicensed radio configured to communicate the information between a first point and a second point over the unlicensed radio frequency and between the first point and a third point over the unlicensed radio frequency when the transceiver is switched to the unlicensed radio frequency, and
      a licensed radio configured to communicate the information between the first point and the second point over the licensed radio frequency and between the first point and the third point over the licensed radio frequency when the transceiver is switched to the licensed radio frequency; and
   a first antenna configured to cause the transceiver to:
      communicate between the first point and the second point over the licensed radio frequency in a point-to-point configuration, and
      communicate between the first point and the third point over the licensed radio frequency in a point-to-point configuration.

18. The system of claim 17, wherein the first antenna is further configured to cause the transceiver to communicate between the first point and the second point over the unlicensed radio frequency.

19. The system of claim 17, further comprising a second antenna configured to cause the transceiver to communicate between the first point and the second point over the unlicensed radio frequency.

20. The system of claim 17, wherein the unlicensed radio frequency comprises a radio frequency within a 5.8 GHz frequency band and the licensed radio frequency comprises a radio frequency within a 6 GHz frequency band.

* * * * *